United States Patent
Yan et al.

(10) Patent No.: US 10,832,355 B2
(45) Date of Patent: Nov. 10, 2020

(54) ANALYSIS METHOD OF COAL CONSUMPTION OF THERMAL POWER UNITS DURING PEAK SHAVING TRANSIENT PROCESS

(71) Applicant: XI'AN JIAOTONG UNIVERSITY, Shaanxi (CN)

(72) Inventors: Junjie Yan, Shaanxi (CN); Chaoyang Wang, Shaanxi (CN); Ming Liu, Shaanxi (CN); Daotong Chong, Shaanxi (CN)

(73) Assignee: XI'AN JIAOTONG UNIVERSITY, Shaanxi (CN)

( * ) Notice: Subject to any disclaimer, the term of this patent is extended or adjusted under 35 U.S.C. 154(b) by 0 days.

(21) Appl. No.: 16/753,335

(22) PCT Filed: Mar. 9, 2019

(86) PCT No.: PCT/CN2019/077574
§ 371 (c)(1),
(2) Date: Apr. 2, 2020

(87) PCT Pub. No.: WO2019/179321
PCT Pub. Date: Sep. 26, 2019

(65) Prior Publication Data
US 2020/0286189 A1     Sep. 10, 2020

(30) Foreign Application Priority Data
Mar. 22, 2018  (CN) .......................... 2018 1 0239634

(51) Int. Cl.
*G06Q 50/06*    (2012.01)
*G06Q 10/04*    (2012.01)

(52) U.S. Cl.
CPC ............. *G06Q 50/06* (2013.01); *G06Q 10/04* (2013.01)

(58) Field of Classification Search
CPC .............................. G06Q 10/04; G06Q 50/06
See application file for complete search history.

(56) References Cited

U.S. PATENT DOCUMENTS 4,464,724 A * 8/1984 Gurr .................... H02J 3/14
                                                    700/291
4,551,812 A * 11/1985 Gurr .................... H02J 3/14
                                                    700/295

(Continued)

FOREIGN PATENT DOCUMENTS

| CN | 103678915 A | 3/2014 |
| CN | 106446404 A | 2/2017 |

(Continued)

*Primary Examiner* — Ronald D Hartman, Jr.

(57) ABSTRACT

An analysis method of coal consumption of the thermal power unit during peak shaving transients includes measuring and recording the coal-feeding rate under different steady-state loads, and then establishing the relationship between the coal-feeding rate and the load, wherein the coal consumption index of the unit during transients can be directly presented by the difference between the real-time coal-feeding rate and a steady-state corresponding value; the total coal increment can be obtained by integrating the real-time coal-feeding rate increment with time; for different loads, the coal consumption increment due to the unit's thermal storage variation can be defined as the thermal storage coal consumption increment; the thermal storage deviation of the unit during transients causes the additional coal consumption, which is defined as the process control coal consumption increment. This work can provide the clear guidance for the fuel control of the thermal power unit during peak shaving processes.

1 Claim, 1 Drawing Sheet

(56) References Cited

U.S. PATENT DOCUMENTS

| | | | | |
|---|---|---|---|---|
| 2010/0017045 | A1* | 1/2010 | Nesler | B60L 53/68 |
| | | | | 700/296 |
| 2011/0204720 | A1* | 8/2011 | Ruiz | H02J 3/14 |
| | | | | 307/66 |
| 2018/0173171 | A1* | 6/2018 | Lin | G06F 1/30 |
| 2020/0140770 | A1* | 5/2020 | Tian | C10K 1/007 |
| 2020/0241491 | A1* | 7/2020 | Przybylski | G05B 13/048 |

FOREIGN PATENT DOCUMENTS

| | | |
|---|---|---|
| CN | 107168062 A | 9/2017 |
| CN | 107368049 A | 11/2017 |
| CN | 108520336 A | 9/2018 |
| JP | 2012122640 A | 6/2012 |

\* cited by examiner

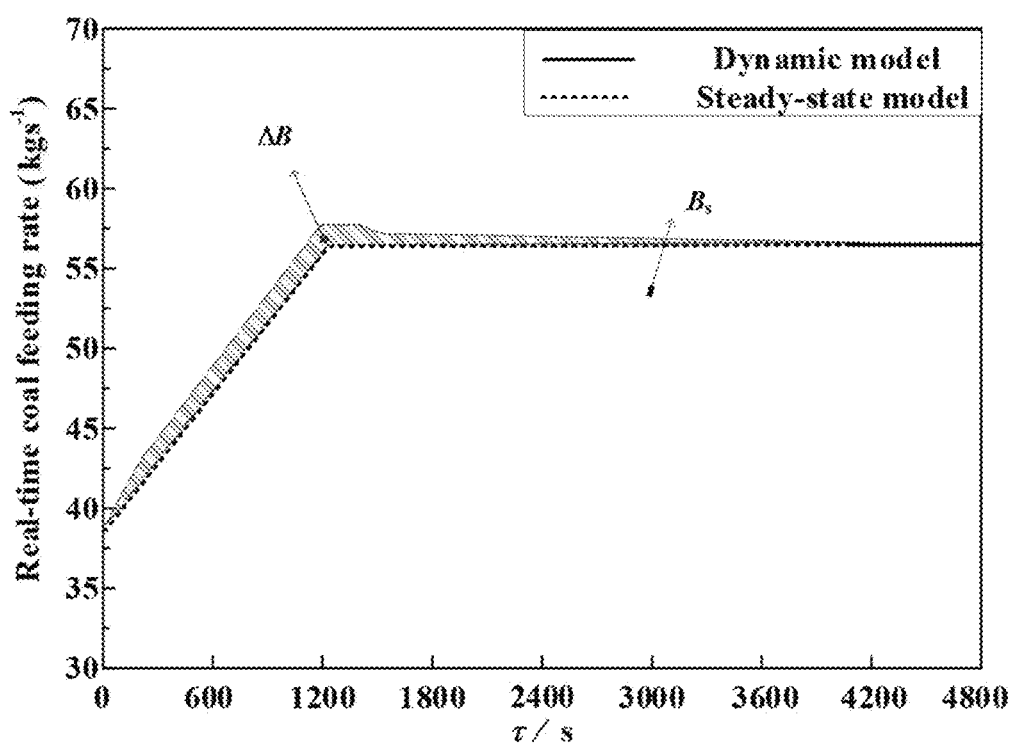

ANALYSIS METHOD OF COAL CONSUMPTION OF THERMAL POWER UNITS DURING PEAK SHAVING TRANSIENT PROCESS

CROSS REFERENCE OF RELATED APPLICATION

This is a U.S. National Stage under 35 U.S.C 371 of the International Application PCT/CN2019/077574, filed Mar. 9, 2019, which claims priority under 35 U.S.C. 119(a-d) to CN 2018/10,239,634.0, filed Mar. 22, 2018.

BACKGROUND OF THE PRESENT INVENTION

Field of Invention

The present invention relates to the field of coal consumption measurement and analysis technology in thermal power units, and more particularly to an analysis method of coal consumption during the peak shaving transient process, which can be adopted for frequent peak shaving thermal power units, and can also provide a reference for the electricity price management department to calculate subsidies for peak shaving thermal power units.

Description of Related Arts

In recent years, the intermittent renewable energy power generation has rapidly developed. The grid connection of the renewable energy power generation has brought new challenges to the safe and stable operation of the entire electricity grid. In order to restrain and mitigate the load fluctuation of the electricity grid, coal-fired power plants frequently participate in the task of peak shaving in China. In the case of the frequent peak shaving, how to evaluate the operation economy of the power station during the process of peak shaving and how to improve the operation economy become increasingly significant. During the peak shaving processes, the thermal storage state of the unit itself will change. Some of the thermal storage change stems from the stored work medium quantity variation, and the other part of the variation of the thermal storage is due to the variation in the temperatures of the work medium and the heat transfer metal. The difference between the real-time output power and the steady-state value according to the coal-feeding rate is attributed to the thermal inertial of the power unit. To ensure the real-time output power generation can be consistent with the power load demand, the coal-feeding rate needs to be regulated accordingly. In order to accurately describe the coal utilization of the coal-fired power unit during the transient process, the present invention provides a coal quantity measurement method in the form of incremental coal-feeding rate considering thermal storage variation, which has some guiding significance to the control of the coal-feeding rate in real operations.

SUMMARY OF THE PRESENT INVENTION

To provide a suitable fuel consumption quantity measurement and analysis method for the thermal power units participating frequent peak shaving tasks, the present invention provides an analysis method of coal consumption for a coal-fired unit during peak shaving transient process, which stems from the essential difference between transient and static characteristics of the coal-fired unit, so as to indicate the actual effect of each part fuel during the load cycling transient process.

To solve the above mentioned technical problem, the present invention provides a technical solution as follows.

An analysis method of coal consumption for the thermal power unit during the peak shaving transient process, provided by the present invention, divides the coal-feeding rate during the peak shaving transient process into three parts, which are respectively the value according to the steady-state load, the increment value due to the thermal storage variation of the thermal power unit and the coal-feeding rate increment caused by the process control irreversibility. The analysis method comprises steps of:

(S1) collecting a coal-feeding rate $\dot{B}_{s-s}$ kg/s into the boiler furnace of the thermal power unit under different load rates, that is, under steady-state working conditions from 30% THA (turbine heat acceptance) to BMCR (boiler maximum continue rate) all possible stable working conditions, and obtaining a piecewise linear interpolation function $f_1$ which is corresponding to the load rates L of the thermal power unit one to one;

(S2) collecting a real-time coal-feeding rate $\dot{B}_{r-t}$ kg/s and a real-time load rate $L_{r-t}$ of the thermal power unit, obtaining a steady-state coal-feeding rate $\dot{B}_s$ kg/s according to the real-time load rate $L_{r-t}$ and $f_1$, and obtaining a real-time coal-feeding rate increment $\Delta\dot{B}$, wherein:

$$\dot{B}_s = f_1(L_{r-t}) \tag{1}$$

$$\Delta\dot{B} = \dot{B}_{r-t} - \dot{B}_s \tag{2}$$

here, $L_{r-t}$ is the real-time load rate of the thermal power unit, $\dot{B}_s$ (kg/s) is the steady-state coal-feeding rate according to $L_{r-t}$ and $f_1$, $\dot{B}_{r-t}$(kg/s) is the real-time coal-feeding rate of the thermal power unit, $\Delta\dot{B}$ (kg/s) is the real-time coal-feeding rate increment of the thermal power unit, the subscript "r-t" indicates the real-time value, the subscript "s" indicates the corresponding value according to the real-time load rate and the established interpolation function $f_1$;

(S3) integrating $\Delta\dot{B}$ over time, and obtaining a total coal consumption increment $\Delta B$ during the peak shaving transient process of the thermal power unit, wherein:

$$\Delta B = \int_0^{\tau_0} \Delta\dot{B} d\tau, \tag{3}$$

here, $\Delta B$ (kg) is the total coal consumption increment during the peak shaving transient process of the thermal power unit, $\tau_0$ (s) is the total time of the peak shaving transient process;

(S4) dividing the total coal consumption increment $\Delta B$ during the peak shaving transient process of the thermal power unit into the thermal storage coal consumption increment $\Delta B_T$ caused by the thermal storage variation and the process control coal consumption increment $\Delta B_{p-c}$ caused by the peak shaving control process;

(S5) calculating the thermal storage variation $\Delta Q_t$ (kJ) of the thermal power unit under different working conditions, wherein: the thermal storage variation $\Delta Q_{t,f}$ (kJ) is the thermal storage variation due to changes in working fluid quality and working fluid enthalpy value, $\Delta Q_{t,M}$ (kJ) is a thermal storage variation due to metal walls' temperature variations;

wherein the thermal storage of each part of the thermal power unit is calculated as follows:

(a) heat storage quantity of metal:

under different working conditions of the thermal power unit, the metal heating surfaces' temperatures of the thermal power unit are different; taking a economizer with a number i as an example, when the load rate of the thermal power unit is L, an average temperature of the metal heating surfaces is $T_{i,M}$, and the heat storage quantity thereof is defined as:

$$Q_{i,M} = M_{i,M} \cdot c_M (T_{i,M} - T_0) \tag{4}$$

here, $Q_{i,M}$ (kJ) is the heat storage quantity of the metal heating surfaces of the economizer, $T_0$ (° C.) is ambient temperature, $M_{i,M}$ (kg) is quality of metal, $c_M$ kJ/(kg·° C.) is specific heat capacity of metal;

the heat storage quantity of the metal heating surfaces of the whole thermal power unit is $$Q_{t,M} = \sum_{i=1}^{n} Q_{i,M}, \tag{5}$$

here, $Q_{t,M}$ (kJ) is the heat storage quantity of the metal heating surfaces the whole thermal power unit, n is the total number of thermal devices (including heaters mainly), the subscript "t" is an abbreviation of "total";

(b) heat storage quantity of the working fluid:

$$Q_{i,f} = M_{i,f} \cdot (h_{i,f} - h_0), \tag{6}$$

$$Q_{t,f} = \sum_{i=1}^{n} Q_{i,f}, \tag{7}$$

(c) total heat storage quantity:

$$Q_t = Q_{t,f} + Q_{t,M} \tag{8}$$

here, $h_0$ (kJ/kg) is the enthalpy value of the working fluid at ambient temperature, $h_{i,f}$ (kJ/kg) is the enthalpy value of the working fluid, $M_{i,f}$ (kg) is quality of stored working fluid in different devices, $Q_{i,f}$ (kJ) is the heat storage quantity of the working fluid, $Q_{t,f}$ (kJ) is the heat storage quantity of all working fluids in the thermal power unit, $Q_t$ (kJ) is the heat storage quantity of all working fluids and the metal heating surfaces in the thermal power unit; and (S6) under 30% THA-BMCR of the thermal power unit, defining a relationship, between the load rate L of the thermal power unit and the heat storage quantity $Q_t$ of all working fluids and the metal heating surfaces in the thermal power unit, as a function $f_2$, and then calculating the thermal storage variation of the thermal power unit between before and after peak shaving by formulas of:

$$\Delta Q_t = f_2(L_2) - f_2(L_1), \tag{9}$$

$$\Delta Q_B = \Delta Q_t - \Delta M_f \cdot h_0, \tag{10}$$

$$\Delta B_T = \frac{\Delta Q_B}{LHV}, \tag{11}$$

$$\Delta B_{p-c} = \Delta B - \Delta B_T, \tag{12}$$

here, $L_1$ is a primary load rate, $L_2$ is a target load rate, $\Delta M_f$ (kg) is a quality difference of the working fluid between before and after load changes, $\Delta Q_B$ (kJ) is the thermal storage variation of the thermal power unit compensated by coal under different working conditions, $\Delta B_T$ (kg) is the total thermal storage coal-feeding increment of the thermal power unit due to the thermal difference under different working conditions, $\Delta B_{p-c}$ (kg) is the total process control coal-feeding increment of the thermal power unit due to process control in the peak shaving process.

Compared with the prior art, the present invention has advantages as follows.

(1) Considering that the thermal power unit is often operated in off-design conditions, the coal consumption of the thermal power unit during the peak shaving transient process will deviate greatly from that of the steady-state operation. The present invention provides a new algorithm for analyzing the coal consumption composition of the thermal power unit during the peaking shaving transient process. According to the method provided by the present invention, through analyzing the coal consumption increment, the extra coal consumption of the thermal power unit during peaking shaving operations can be intuitively reflected.

(2) The present invention is simple to implement, does not need to add additional equipment, has low investment, and has a very short recovery period.

BRIEF DESCRIPTION OF THE DRAWINGS

The drawing shows the real-time change of the coal-feeding rate and the steady-state load rate of a 660 MW thermal power unit during the load increasing from 50% to 75% THA.

DETAILED DESCRIPTION OF THE PREFERRED EMBODIMENT

The present invention is further explained in detail with the accompanying drawing and embodiment as follows.

An analysis method of coal consumption for a thermal power unit during a peak shaving transient process, provided by the present invention, divides a coal-feeding rate during the peak shaving transient process into three parts, which are respectively a value according to a steady-state load, an increment value due to a thermal storage variation of the thermal power unit and a coal-feeding rate increment caused by a process control irreversibility. The analysis method comprises steps of:

(S1) collecting a coal-feeding rate $\dot{B}_{s-s}$ kg/s into a boiler furnace of the thermal power unit under different load rates, that is, under steady-state working conditions from 30% THA (turbine heat acceptance) to BMCR (boiler maximum continue rate) all possible stable working conditions, and obtaining a piecewise linear interpolation function $f_1$ which is corresponding to load rates L of the thermal power unit one to one;

(S2) collecting a real-time coal-feeding rate $\dot{B}_{r-t}$ kg/s and a real-time load rate $L_{r-t}$ of the thermal power unit, wherein a black solid line indicates a coal-feeding rate under a real-time load rate of the thermal power unit, obtaining a steady-state coal-feeding rate $\dot{B}_s$ kg/s according to the real-time load rate $L_{r-t}$ and $f_1$, and obtaining a real-time coal-feeding rate increment $\Delta \dot{B}$, wherein:

$$\dot{B}_s = f_1(L_{r-t}) \tag{1}$$

$$\Delta \dot{B} = \dot{B}_{r-t} - \dot{B}_s \tag{2}$$

here, $L_{r-t}$ is the real-time load rate of the thermal power unit, $\dot{B}_s$ (kg/s) is the steady-state coal-feeding rate according to $L_{r-t}$ and $f_1$, $\dot{B}_{r-t}$ (kg/s) is the real-time coal-feeding rate of the thermal power unit, $\Delta \dot{B}$ (kg/s) is the real-time coal-feeding rate increment of the thermal power unit, a subscript "r-t" indicates a real-time value, a subscript "s" indicates a corresponding value according to the real-time load rate and the established interpolation function $f_1$;

(S3) integrating $\Delta \dot{B}$ over time, and obtaining a total coal consumption increment $\Delta B$ during the peak shaving transient process of the thermal power unit, wherein a black area defined by the black solid line and the black dotted line indicates values of $\Delta B$, and $$\Delta B = \int_0^{\tau_0} \Delta \dot{B} d\tau, \qquad (3)$$

here, $\Delta B$ (kg) is the total coal consumption increment during the peak shaving transient process of the thermal power unit, $\tau_0$ (s) is a total time of the peak shaving transient process;

(S4) dividing the total coal consumption increment $\Delta B$ during the peak shaving transient process of the thermal power unit into a thermal storage coal consumption increment $\Delta B_T$ caused by the thermal storage variation and a process control coal consumption increment $\Delta B_{p-c}$ caused by the peak shaving control process;

(S5) calculating the thermal storage variation $\Delta Q_t$ (kJ) of the thermal power unit under different working conditions, wherein: a thermal storage variation $\Delta Q_{t,f}$ (kJ) is a thermal storage variation due to changes in working fluid quality and working fluid enthalpy value, $\Delta Q_{t,M}$ (kJ) is a thermal storage variation due to metal walls' temperature variations;

wherein the thermal storage of each part of the thermal power unit is calculated as follows:

(a) heat storage quantity of metal:

under different working conditions of the thermal power unit, the metal heating surfaces' temperatures of the thermal power unit are different; taking an economizer with a number i as an example, when the load rate of the thermal power unit is L, an average temperature of the metal heating surfaces is $T_{i,M}$, and the heat storage quantity thereof is defined as:

$$Q_{i,M} = M_{i,M} \cdot c_M (T_{i,M} - T_0) \qquad (4),$$

here, $Q_{i,M}$ (kJ) is the heat storage quantity of the metal heating surfaces of the economizer, $T_0$ (° C.) is ambient temperature, $M_{i,M}$ (kg) is quality of metal, $c_M$ kJ/(kg·° C.) is specific heat capacity of metal;

the heat storage quantity of the metal heating surfaces of the whole thermal power unit is $$Q_{t,M} = \sum_{i=1}^{n} Q_{i,M}, \qquad (5)$$

here, $Q_{t,M}$ (kJ) is the heat storage quantity of the metal heating surfaces of the whole thermal power unit, n is a total number of thermal devices (including heaters mainly), a subscript "t" is an abbreviation of "total";

(b) heat storage quantity of working fluid:

$$Q_{i,f} = M_{i,f} \cdot (h_{i,f} - h_0), \qquad (6)$$

$$Q_{t,f} = \sum_{i=1}^{n} Q_{i,f}, \qquad (7)$$

(c) total heat storage quantity:

$$Q_t = Q_{t,f} + Q_{t,M} \qquad (8),$$

here, $h_0$ (kJ/kg) is an enthalpy value of the working fluid at ambient temperature, $h_{i,f}$ (kJ/kg) is an enthalpy value of the working fluid, $M_{i,f}$ (kg) is quality of stored working fluid in different devices, $Q_{i,f}$ (kJ) is the heat storage quantity of the working fluid, $Q_{t,f}$ (kJ) is the heat storage quantity of all working fluids in the thermal power unit, $Q_t$ (kJ) is the heat storage quantity of all working fluids and the metal heating surfaces in the thermal power unit; and (S6) under 30% THA-BMCR of the thermal power unit, defining a relationship, between the load rate L of the thermal power unit and the heat storage quantity $Q_t$ of all working fluids and the metal heating surfaces in the thermal power unit, as a function $f_2$, and then calculating the thermal storage variation of the thermal power unit between before and after peak shaving by formulas of:

$$\Delta Q_t = f_2(L_2) - f_2(L_1), \qquad (9)$$

$$\Delta Q_B = \Delta Q_t - \Delta M_f \cdot h_0, \qquad (10)$$

$$\Delta B_T = \frac{\Delta Q_B}{LHV}, \qquad (11)$$

$$\Delta B_{p-c} = \Delta B - \Delta B_T, \qquad (12)$$

here, $L_1$ is a primary load rate, $L_2$ is a target load rate, $\Delta M_f$ (kg) is a quality difference of the working fluid between before and after load changes, $\Delta Q_B$ (kJ) is the thermal storage variation of the thermal power unit compensated by coal under different working conditions, $\Delta B_T$ (kg) is the total thermal storage coal-feeding increment of the thermal power unit due to the thermal difference under different working conditions, $\Delta B_{p-c}$ (kg) is the total process control coal-feeding increment of the thermal power unit due to process control in the peak shaving process.

It is obvious that through the above analysis method, the coal consumption increment, caused by the thermal storage variation and the process control in the peak shaving transient process of the thermal power unit, is obtained.

The drawing shows the real-time change of the coal-feeding rate and the steady-state load rate of a 660MW thermal power unit during the load increase from 50% to 75% THA. The real-time coal-feeding rate and the coal-feeding rate increment in the variable load operation process, and the total coal consumption increment in the variable load transient process of the peak shaving power station can be seen fr©m the drawing.

What is claimed is:

1. An analysis method of coal consumption for a thermal power unit during a peak shaving transient process, wherein: a coal-feeding rate during the peak shaving transient process is divided into three parts, which are respectively a value according to a steady-state load, an increment value due to a thermal storage variation of a thermal power unit and a coal-feeding rate increment caused by process control irreversibility, and the analysis method comprises steps of:

(S1) collecting a coal-feeding rate $\dot{B}_{s-s}$ kg/s into a boiler furnace of the thermal power unit under different load rates, that is, under steady-state working conditions from 30% THA (turbine heat acceptance) to BMCR (boiler maximum continue rate) all possible stable working conditions, and obtaining a piecewise linear interpolation function $f_1$ which is corresponding to load rates L of the thermal power unit one to one;

(S2) collecting a real-time coal-feeding rate $\dot{B}_{r-t}$ kg/s and a real-time load rate $L_{r-t}$ of the thermal power unit, obtaining a steady-state coal-feeding rate $\dot{B}_s$ kg/s according to the real-time load rate $L_{r-t}$ and $f_1$, and obtaining a real-time coal-feeding rate increment $\Delta\dot{B}$, wherein:

$$\dot{B}_s = f_1(L_{r-t}) \quad (1),$$

$$\Delta\dot{B} = \dot{B}_{r-t} - \dot{B}_s \quad (2),$$

here, $L_{r-t}$ is the real-time load rate of the thermal power unit, $\dot{B}_s$ (kg/s) is the steady-state coal-feeding rate according to $L_{r-t}$ and $f_1$, $\dot{B}_{r-t}$ (kg/s) is the real-time coal-feeding rate of the thermal power unit, $\Delta\dot{B}$ (kg/s) is the real-time coal-feeding rate increment of the thermal power unit, a subscript "r-t" indicates a real-time value, a subscript "s" indicates a corresponding value according to the real-time rate and the interpolation function $f_1$;

(S3) integrating $\Delta\dot{B}$ over time, and obtaining a total coal consumption increment $\Delta B$ during the peak shaving transient process of the thermal power unit, wherein:

$$\Delta B = \int_0^{\tau_0} \Delta\dot{B} d\tau, \quad (3)$$

here, $\Delta B$ (kg) is the total coal consumption increment during the peak shaving transient process of the thermal power unit, $\tau_0$ (s) is a total time of the peak shaving transient process;

(S4) dividing the total coal consumption increment $\Delta B$ during the peak shaving transient process of the thermal power unit into a thermal storage coal consumption increment $\Delta B_T$ caused by the thermal storage variation and a process control coal consumption increment $\Delta B_{p-c}$ caused by the peak shaving control process;

(S5) calculating the thermal storage variation $\Delta Q_t$ (kJ) of the thermal power unit under different working conditions, wherein: a thermal storage variation $\Delta Q_{t,f}$ (kJ) is a thermal storage variation due to changes in working fluid quality and working fluid enthalpy value, $\Delta Q_{t,M}$ (kJ) is a thermal storage variation due to metal walls' temperature variations;

wherein the thermal storage of each part of the thermal power unit is calculated as follows:

(a) heat storage quantity of metal:

under different working conditions of the thermal power unit, metal heating surfaces' temperatures of the thermal power unit are different; taking a economizer with a number i as an example, when the load rate of the thermal power unit is L, an average temperature of the metal heating surfaces is $T_{i,M}$, and the heat storage quantity thereof is defined as:

$$Q_{i,M} = M_{i,M} c_M (T_{i,M} - T_0) \quad (4)$$

here, $Q_{i,M}$ (kJ) is the heat storage quantity of the metal heating surfaces of the economizer, $T_0$ (° C.) is ambient temperature, $M_{i,M}$ (kg) is quality of metal, $c_M$ kJ/(kg·° C.) is specific heat capacity of metal;

the heat storage quantity of the metal heating surfaces of the thermal power unit is $$Q_{t,M} = \sum_{i=1}^{n} Q_{i,M}, \quad (5)$$

here, $Q_{t,M}$ (kJ) is the heat storage quantity of the metal heating surfaces of the whole thermal power unit, n is a total number of thermal devices, a subscript "t" is an abbreviation of "total";

(b) heat storage quantity of a working fluid:

$$Q_{i,f} = M_{i,f} \cdot (h_{i,f} - h_0), \quad (6)$$

$$Q_{t,f} = \sum_{i=1}^{n} Q_{i,f}, \quad (7)$$

(c) total heat storage quantity:

$$Q_t = Q_{t,f} + Q_{t,M} \quad (8),$$

here, $h_0$ (kJ/kg) is an enthalpy value of the working fluid at ambient temperature, $h_{i,f}$ (kJ/kg) is an enthalpy value of the working fluid, $M_{i,f}$ (kg) is quality of stored working fluid in different devices, $Q_{i,f}$ (kJ) is the heat storage quantity of the working fluid, $Q_{t,f}$ (kJ) is the heat storage quantity of all working fluids in the thermal power unit, $Q_t$ (kJ) is the heat storage quantity of all working fluids and the metal heating surfaces in the thermal power unit; and (S6) under 30% THA-BMCR of the thermal power unit, defining a relationship, between the load rate L of the thermal power unit and the heat storage quantity $Q_t$ of all working fluids and the metal heating surfaces in the thermal power unit, as a function $f_2$, and then calculating the thermal storage variation of the thermal power unit between before and after peak shaving by formulas of:

$$\Delta Q_t = f_2(L_2) - f_2(L_1), \quad (9)$$

$$\Delta Q_B = \Delta Q_t - \Delta M_f \cdot h_0, \quad (10)$$

$$\Delta B_T = \frac{\Delta Q_B}{LHV}, \quad (11)$$

$$\Delta B_{p-c} = \Delta B - \Delta B_T, \quad (12)$$

here, $L_1$ is a primary load rate, $L_2$ is a target load rate, $\Delta M_f$ (kg) is a quality difference of the working fluid between before and after load changes, $\Delta Q_B$ (kJ) is the thermal storage variation value of the thermal power unit compensated by coal under different working conditions, $\Delta B_T$ (kg) is the total thermal storage coal-feeding increment of the thermal power unit due to the thermal difference under different working conditions, $\Delta B_{p-c}$ (kg) is the total process control coal-feeding increment of the thermal power unit due to process control in the peak shaving process.

* * * * *